US008140590B2

(12) United States Patent
Genovese et al.

(10) Patent No.: US 8,140,590 B2
(45) Date of Patent: Mar. 20, 2012

(54) DYNAMIC GENERATION OF USER INTERFACES AND AUTOMATED MAPPING OF INPUT DATA FOR SERVICE-ORIENTED ARCHITECTURE-BASED SYSTEM MANAGEMENT APPLICATIONS

(75) Inventors: William M. Genovese, Cornelius, NC (US); Sivananthan Perumal, Bangalore (IN); Akshay V. Rao, New York, NY (US); Dinesh Ganesh Shetty, Bangalore, IN (US); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/409,021

(22) Filed: Mar. 23, 2009

(65) Prior Publication Data
US 2010/0241978 A1    Sep. 23, 2010

(51) Int. Cl.
G06F 7/00    (2006.01)
G06F 17/30   (2006.01)
(52) U.S. Cl. ...................................... 707/804
(58) Field of Classification Search .................... 707/804
See application file for complete search history.

(56) References Cited
U.S. PATENT DOCUMENTS
7,149,747 B1   12/2006   Cheng et al.

OTHER PUBLICATIONS

Khushraj et al., "Ontological Approach to Generate Personalized User Interfaces for Web Services", ISWC 2005, LNCS 3729, pp. 916-927, 2005, Springer-Verlag Berlin Heidelberg.*
Spatzier et al.; Method and system for dynamic generation of user interfaces and automated mapping of input data for SOA-based system management applications; Jan. 15, 2008; 8 pages.
He et al.; Adaptive User Interface Generation for Web Services; IEEE International Conference on e-Business Engineering; pp. 536-539.
PCT International Search Report and Written Opinion; Applicant's file reference DE920080042; Date of Mailing Apr. 22, 2010; International Application No. PCT/EP2010/051468, International Filing Date Feb. 8, 2010. Applicant: International Business Machines Corporation. 12 pages.

* cited by examiner

Primary Examiner — Michael Hicks
(74) Attorney, Agent, or Firm — Schmeiser, Olsen & Watts; Thomas E. Tyson

(57) ABSTRACT

A method and system for dynamically generating a semantically correct user interface (UI) panel for a service request and automatically mapping input data for service-oriented architecture-based system management applications. A document is received that includes semantic annotations specifying semantics of elements of a service request input message. During runtime, a UI panel is generated based on the semantics and by interpreting metadata generated by interpreting hints included in the document. Further, the semantic annotations may include a mapping definition of information technology (IT) resource selections. Based on the mapping definition, the IT resource selections are extracted from a registry and automatically mapped to a UI input element in a UI panel. In response to selecting an IT resource from the UI panel, properties of the selected IT resource are automatically mapped to an element of the service request input message according to the semantic annotations.

15 Claims, 8 Drawing Sheets

DYNAMIC GENERATION OF USER INTERFACES AND AUTOMATED MAPPING OF INPUT DATA FOR SERVICE-ORIENTED ARCHITECTURE-BASED SYSTEM MANAGEMENT APPLICATIONS

FIELD OF THE INVENTION

The present invention relates to system management applications implemented by service-oriented architecture (SOA) where various services are combined into system management flows in order to manage information technology (IT) infrastructures. More particularly, the present invention relates to a data processing method and system for dynamically generating user interfaces and automatically mapping input data for SOA-based system management applications.

BACKGROUND OF THE INVENTION

The implementation of system management applications has moved to a service-oriented approach. All kinds of IT resources are encapsulated as software services that offer a number of resource-specific interfaces for querying state (e.g., query current CPU temperature) and controlling a resource. System management applications then use the services to control underlying IT infrastructures. The set of services in a SOA-like system is very dynamic and rapidly changing. New services can be made available, services can be removed, or the interface of services can change. In a system management application operated by an end user, it is necessary to provide user interface (UI) panels in order to display data to the user or to get input from the user. These UI panels usually have to be implemented on a per-service basis. For management flows comprising several services, the panels for single services are combined into a flow of panels for entering data for each service, thereby introducing redundancy in input and output data that needs to be addressed by costly efforts of service implementers and UI programmers. The fact that services in a SOA-like system can rapidly change imposes a need for costly maintenance and rework on UI panels so that the UI keeps up-to-date with the management services of the underlying system management applications. FIG. 1 is a block diagram of a conventional system 100 that includes a software service 102 that has an interface 104. Interface 104 is syntactically well-defined in a service description 106 (a.k.a. service interface description) that includes a schema 108 (e.g., an Extensible Markup Language (XML) schema document (XSD)) that specifies the structure of input and output data for service 102. By analyzing the description 106 of service 102 and evaluating the corresponding schema 108 (e.g., corresponding XSD), it is possible to derive a simple UI panel 110 that includes input elements 112, where the UI panel is to be used by a user for invoking service 102. Known techniques for generating UI panel 110 for a service request (i.e., invocation) are limited to a syntactical analysis of service description 106 and the associated schema 108 (i.e., all elements defined for the input document of service 102 can be rendered in the UI using appropriate UI elements according to basic rules and the rendered elements are labeled using the element names (i.e., field names) given in service description 106 and schema 108). This known syntactical analysis allows valuable semantic meanings of the service provider to be lost due to a disconnect between the service provider and the UI provider. A conventional conveyance of semantic meanings for UI panel generation is inefficient and costly due to a large amount of communication required between the UI provider and the service provider, as well as extensive hard-coding included in the UI implementation efforts. Further, conventional technologies are deficient in how resource data may be mapped to input data for service requests, thereby requiring expensive and time-consuming manual entry of input data. For example, a known rendering of ordinary input fields in a UI panel for a server resource's multiple properties required by a service of a system management application requires manual entry of property values. Thus, there exists a need to overcome at least one of the preceding deficiencies and limitations of the related art.

SUMMARY OF THE INVENTION

In first embodiments, the present invention provides a computer-implemented method of dynamically generating a semantically correct user interface (UI) panel for a service request. The method comprises: a computer system receiving a document that includes a plurality of semantic annotations specifying semantics of a plurality of elements of an input message for a service request; the computer system generating metadata by interpreting one or more semantic annotations of the plurality of semantic annotations included in the document; during runtime, the computer system generating a UI panel based on the semantics by interpreting the metadata; and the computer system receiving user input for the service request via the UI panel.

In a first aspect of the first embodiments, the step of generating the UI panel includes labeling a first element of the plurality of elements of the input message with a first label in the UI panel. The first label is semantically correct based on the semantics.

In a second aspect of the first embodiments, the method further comprises defining a first mapping of the first element to the first label based on a first client locale and defining a second mapping of the first element to a second label based on a second client locale. The labeling of the first element with the first label is based on the first mapping.

In a third aspect of the first embodiments, the method further comprises: determining a first field in the UI panel includes a value; and displaying a second field in the UI panel in response to determining that the first field includes the value.

In second embodiments, the present invention provides a computer-implemented method of automatically mapping resource registry data to input data using semantic annotations. The method comprises: a computer system receiving a document having a plurality of semantic annotations that includes a mapping definition of a plurality of selections of information technology (IT) resources; the computer system automatically extracting the plurality of selections of IT resources from a resource registry, where the extracting is based on the mapping definition; the computer system automatically mapping the extracted plurality of selections of IT resources to a user interface (UI) input element; the computer system generating a UI panel that provides the extracted plurality of selections of IT resources in the UI input element; displaying the UI panel on a display device in response to generating the UI panel; the computer system receiving a selection of an IT resource, where the selection is included in the plurality of selections of IT resources; and responsive to receiving the selection, the computer system automatically mapping one or more properties of the IT resource to an element of an input message of a service request according to the plurality of semantic annotations of the document.

In third embodiments, the present invention provides a computer-implemented method of dynamically modifying a user interface (UI) panel in a complex flow. The method comprises: a computer system mapping a plurality of input elements of a plurality of services of a complex flow to a plurality of unique fields, wherein the input elements are associated with the unique fields in a many-to-one correspondence; at runtime, the computer system determining a unique field of the plurality of unique fields includes a value as a result of a prior inclusion of an input element in a rendering of a previous UI panel in the complex flow, where the input element corresponds to the unique field; responsive to determining that the unique field includes the value, the computer system omitting the input element in a rendering of a current UI panel in the complex flow; and subsequent to omitting the input element, the computer system displaying the current UI panel on a display device without the input element included in the current UI panel.

Systems and computer program products corresponding to the above-summarized methods are also described and claimed herein.

One or more embodiments of the present invention provide a technique for dynamically generating user interface panels and automatically mapping input data. Furthermore, embodiments of the present invention reduce the amount of user input required in UI panels associated with a single service invocation of a complex flow, while still allowing flexibility during runtime. Moreover, the present invention allows a service provider to express semantics as part of service descriptions, thereby preventing a loss of semantic meaning in UI panels being generated.

DETAILED DESCRIPTION OF THE INVENTION

Overview

The present invention may allow service implementers to attach effective semantic annotation to a description of a service (e.g., web service) to support UI rendering. UI pre-processing components may be defined that interpret the semantic annotations in order to create a semantically correct UI for a service invocation. As used herein, a semantically correct UI is defined as a UI in accordance with semantic intentions of a provider or implementer of a service. Furthermore, data from IT resource registries may be automatically retrieved and mapped to UI input elements and finally to service input data. More particularly, the present invention may be a data processing method and system for dynamically generating user interface panels from the descriptions of combined and invoked services and for automatically mapping input data extracted from IT resource registries using semantic annotation of service interfaces.

Dynamic User Interface Generation and Automatic Input Data Mapping System

Figure 2:
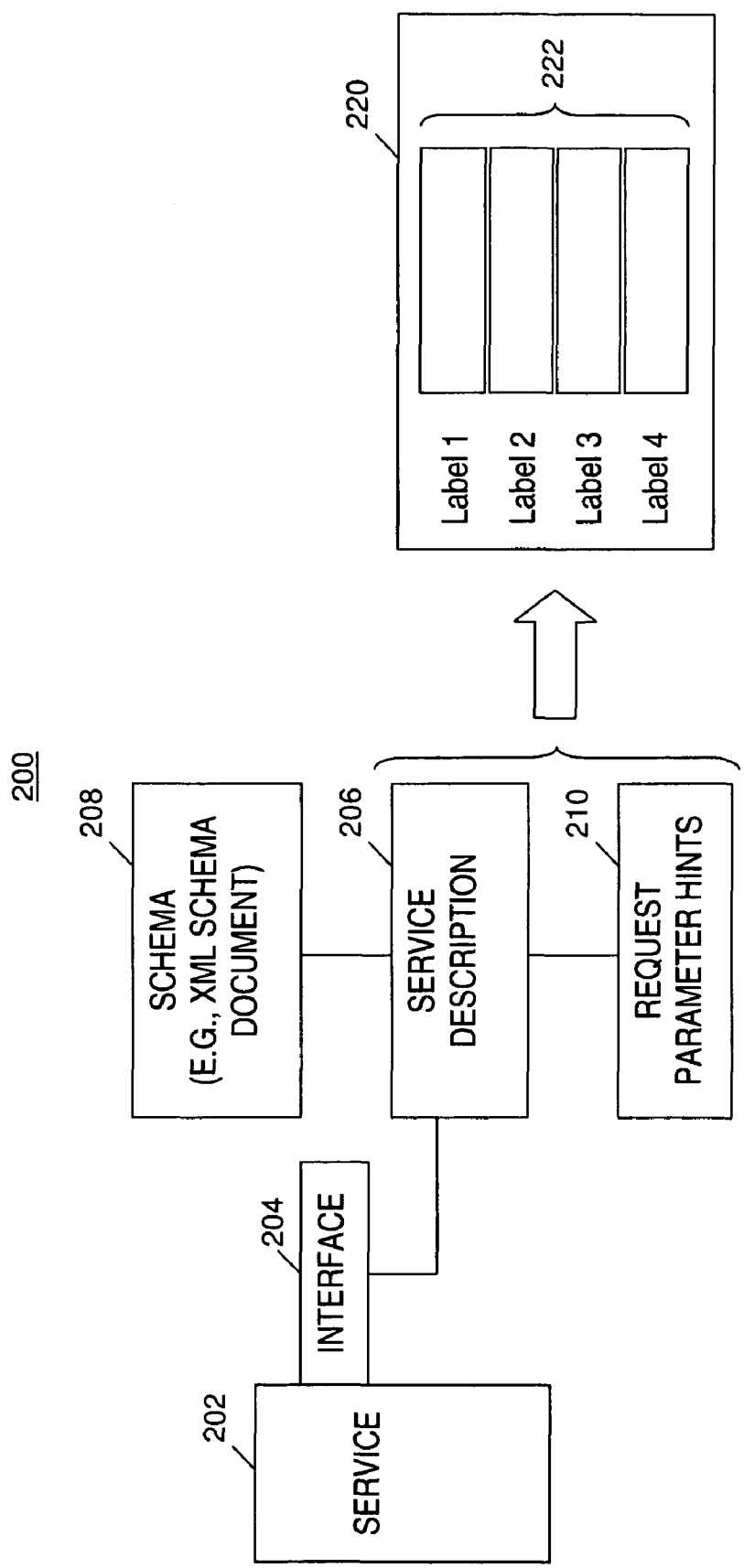
FIG. 2 is a block diagram of a system for attaching semantic annotations to support UI panel generation, in accordance with embodiments of the present invention.

FIG. 2 is a block diagram of a system for attaching semantic annotations to support UI panel generation, in accordance with embodiments of the present invention. System 200 includes a software service 202 that has an interface 204. Interface 204 is syntactically well-defined in a service interface description 206 (a.k.a. service description) that includes a schema 208 (e.g., XSD) and an additional descriptor, request parameter hints 210, which is introduced by the present invention. By analyzing service description 206 and evaluating schema 208 and request parameter hints 210, a UI panel 220 that includes input elements 222 is rendered, where the UI panel is to be used by the user for invoking service 202 in an operation of a SOA-based system management application.

Service description 206 is, for example, a Web Services Description Language (WSDL) document that describes the operation(s) provided by service 202. The structure of input and output data for the described operation(s) is defined by schema 208. Schema 208 is, for example, an XML schema document.

Request parameter hints 210 is an XML document that is attached to service description 206. Request parameter hints 210 provides additional information and semantic annotation for elements of an input message for a service request (a.k.a. service request input message).

In one embodiment, each element of the input message is referenced by an XPath name or an XPath-like name (i.e., a name interpreted within the XML document representing the input message according to the input message's XSD) by zero to N hints (a.k.a. semantic annotations) in request parameter hints 210. As used herein, a hint is defined as a semantic annotation that specifies how a portion of a UI is to be rendered. Each hint provides information such as:

Semantically correct labeling of message elements in UI panel 220. For example, a service implementer defines how a field should be labeled in UI panel 220 in order to convey correct semantics for the field. These name-label-mappings may be uniquely defined for different locales. For example, a first set of labels in a UI panel is displayed for a first client locale and a second set of labels in the UI panel is displayed for a second client locale, where the first set of labels is different from the second set of labels and the first client locale is different from the second client locale. Thus, a UI rendering engine may label a field with a first label in response to a user being in a first locale and may label the same field with a second label in response to the user being in a second locale.

Additional selection and display criteria for UI panel 220 that cannot be expressed using XML Schema in schema 208. In one embodiment, an additional display criterion is a condition that specifies that field X in UI panel 220 is displayed only when a value has been entered in another field Y in UI panel 220.

Definition of IT resource selections and mapping of IT resource properties to input data of the service request input message. It may be defined that one or more fields in a section of the service request input message are to be filled with one or more predefined properties of an IT resource that the user has to select in UI panel 220 (e.g., element X is to be filled in with the value of property Y of a resource of type Z). The service request input message is generated during runtime based on the service description 206 and the schema 208, and is then sent to the service implementation. The request parameter hints document 210 denotes that one or more elements of the service request input message may be filled with mapped resource data. Further, the set of IT resources to be offered for user selection may be defined, for example, in terms of the type of IT resource and other selection criteria (e.g., a predefined state of the resource or a predefined computing architecture of the resource, such as computer systems with x86 architecture). Still further, resource selections displayed to the user may be created at runtime and the mapping of request elements to properties of the resource selected by the user is automated.

Figure 1:
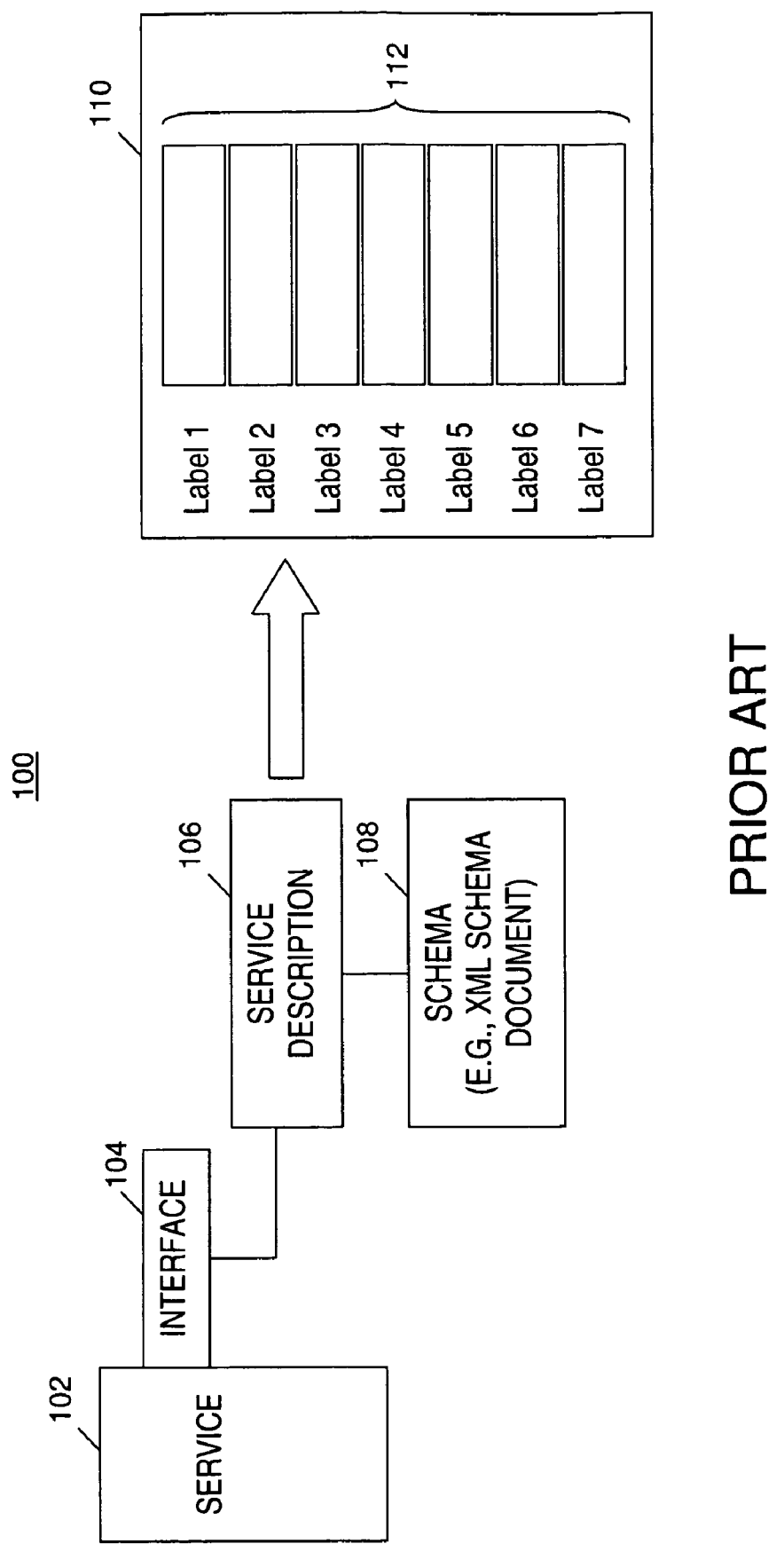
FIG. 1 is a block diagram of a prior art system for generating a user interface panel.

As one example, the semantic information provided by one or more hints in request parameter hints 210 allows input elements 222 to be a reduced set of input elements as compared to the set of input elements 112 in FIG. 1.

Figure 3:
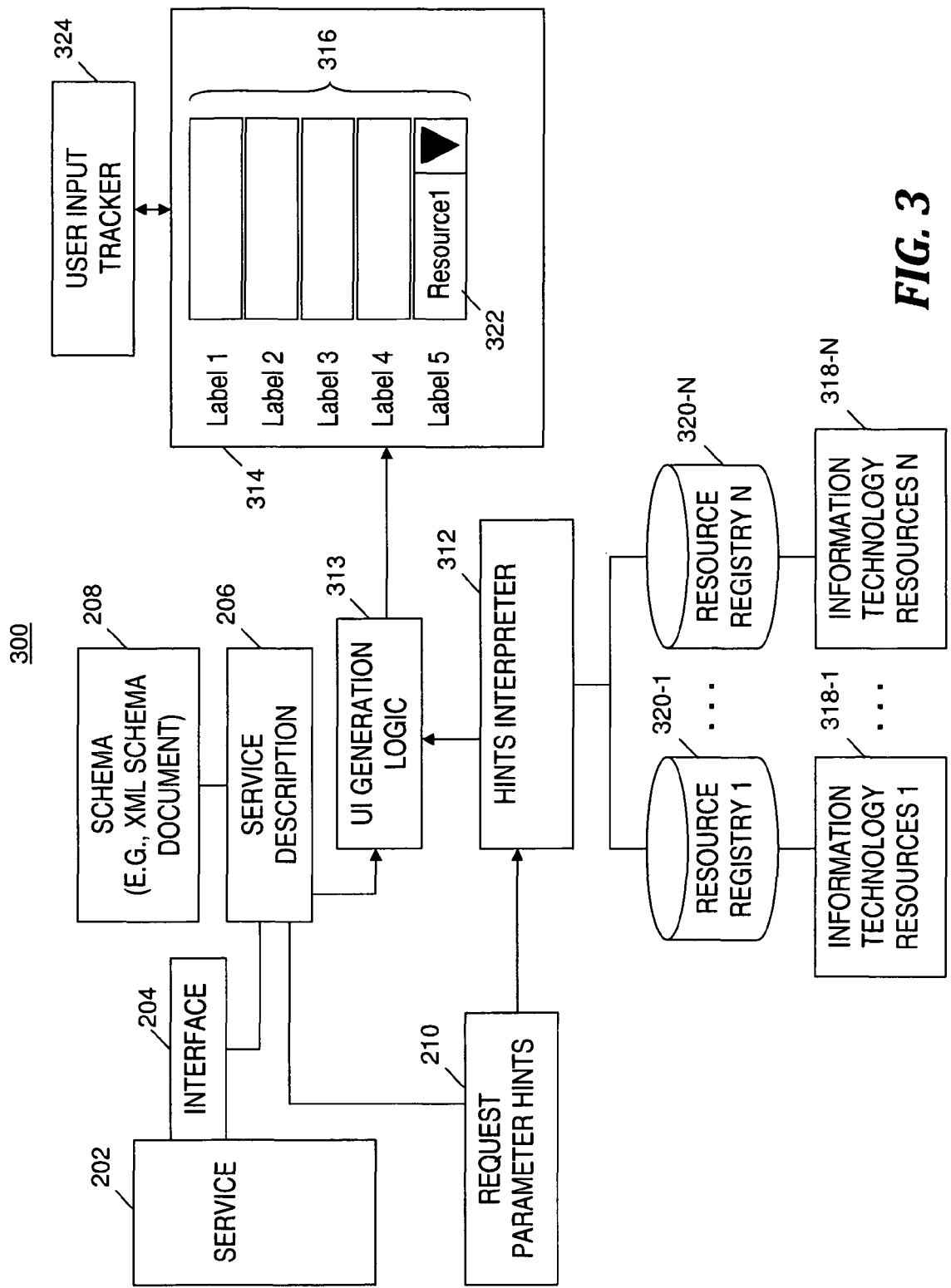
FIG. 3 is a block diagram of a system for dynamically generating a semantically correct UI, automatically mapping resource registry data to input data, and dynamically modifying UI panels in a complex flow, where the system includes the system of FIG. 2, in accordance with embodiments of the present invention.

FIG. 3 is a block diagram of a system for dynamically generating a semantically correct UI, automatically mapping resource registry data to input data, and dynamically modifying UI panels in a complex flow, where the system includes the system of FIG. 2, in accordance with embodiments of the present invention. System 300 includes software service 202 that has an interface 204. As in FIG. 2, interface 204 is syntactically well-defined in service interface description 206 (e.g., WSDL document) that includes schema 208 and request parameter hints 210. The functionality of service 202, interface 204, service description 206, schema 208, and request parameter hints 210 in FIG. 3 is the same functionality described above relative to FIG. 2. The information provided by the hints in request parameter hints 210 in FIG. 3 is the same as the information described above relative to FIG. 2.

System 300 also includes a hints interpreter 312, which is a UI pre-processing component introduced by the present invention. Hints interpreter 312 interprets request parameter hints 210 and generates and sends metadata to UI generation logic 313, which understands and processes the metadata. The UI generation logic 313 also receives the service description 206 and schema 208 as input. In one embodiment, the UI generation logic 313 is implementation code in a UI rendering engine (not shown) (e.g., a Web 2.0 web front end). By interpreting the metadata received from hints interpreter 312 along with the service description 206 and schema 208, the UI generation logic 313 generates the correct UI panels including UI panel 314, which includes a set of input elements 316. UI panel 314 is generated by the UI generation logic 313 according to the semantics desired by a service designer/implementer (i.e., the semantics that are included in request parameter hints 210). A user utilizes UI panel 314 for invoking service 202 in an operation of a SOA-based system management application. Further details about dynamically generating UI panels using the hints interpreter are presented below relative to FIG. 4.

Hints interpreter 312 also retrieves information about one or more sets of managed IT resources 318-1, . . . , 318-N from one or more resource registries 320-1, . . . , 320-N (a.k.a. one or more management databases) according to mapping definitions included in request parameter hints 210. Request parameter hints 210 specify that one or more elements of the service request input message are filled with properties of a particular type of resource. For each type of resource, there is a corresponding registry (e.g., one registry for servers, one registry for storage partitions, etc.) The types of resources may be defined by standards such as the Common Information Model (CIM). These standards also define properties that are provided by each type of resource. The properties provided by a type of resource are present in resource descriptions stored in the resource registry corresponding to the type of resource. Properties defined by the aforementioned standards may then be mapped to the service request input message. The N resource registries are associated with the N sets of IT resources in a one-to-one correspondence.

Hints interpreter 312 retrieves the information from one or more resource registries 320-1, . . . , 320-N to generate one or more selection elements in UI panels, including selection element 322, which is presented to a user by a display of UI panel 314 on a display device. In response to a user selecting an entry in selection element 322, properties of the IT resource represented to the user are automatically mapped to one or more elements of the service request input message, as defined in request parameter hints 210 attached to service description 206. Further details about mapping information from the resource registries are discussed below relative to FIGS. 5A and 5B.

System 300 also may include a user input tracker 324. At runtime, a user input tracker 324 tracks the input made by a user. Furthermore, before the generation of each UI panel, user input tracker 324 checks whether a unique field already contains a value, where an input element of a single service of a flow is mapped to the unique field. This check by the user input tracker 324 allows the present invention to dynamically modify a UI panel according to input made by the user. Further details about dynamically modifying a UI panel using the user input tracker 324 are discussed below relative to FIG. 6.

Dynamic User Interface Generation and Automatic Input Data Mapping Processes

Figure 4:
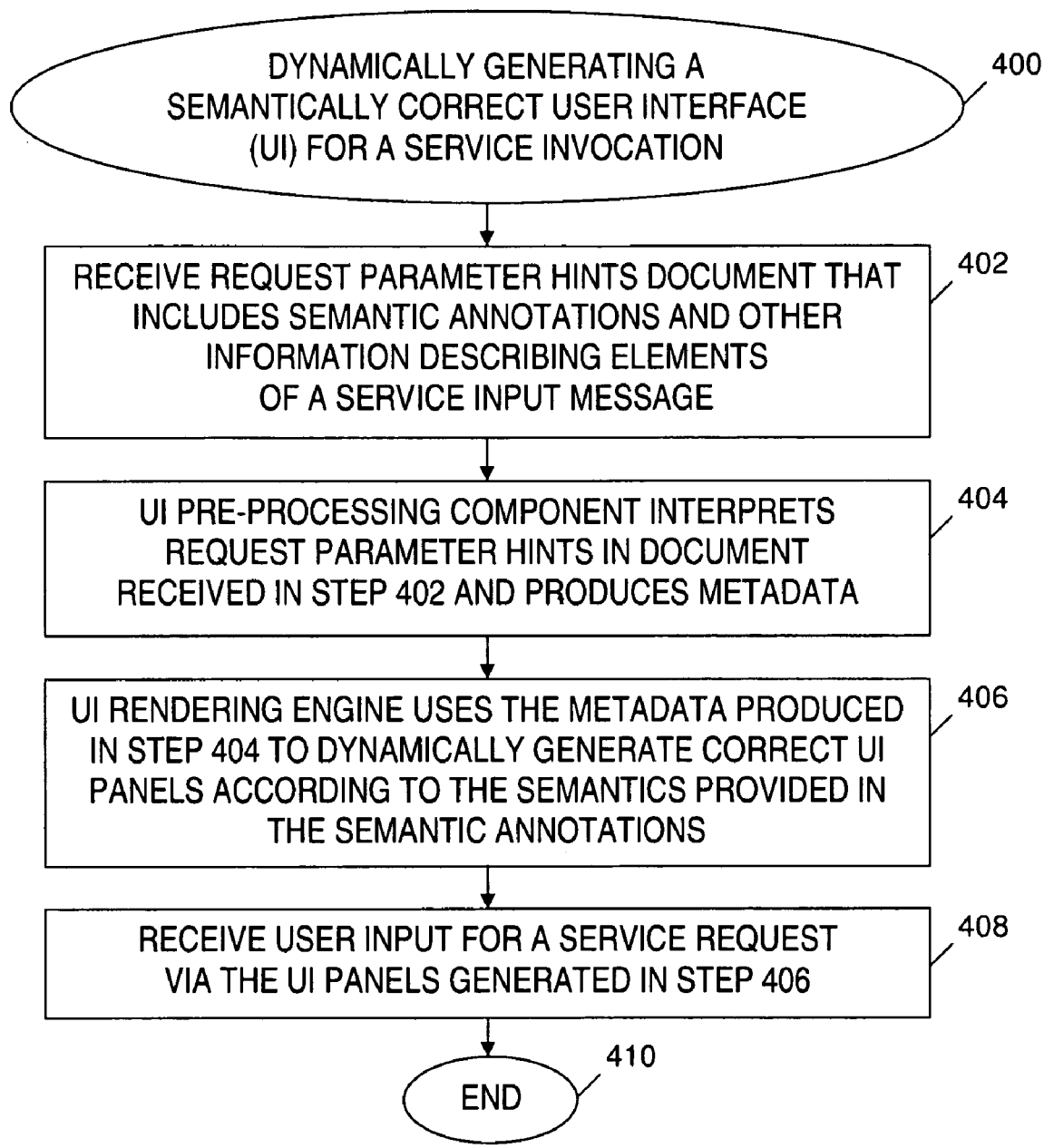
FIG. 4 is a flowchart of a process for dynamically generating a semantically correct UI in the system of FIG. 3, in accordance with embodiments of the present invention.

FIG. 4 is a flowchart of a process for dynamically generating a semantically correct UI in the system of FIG. 3, in accordance with embodiments of the present invention. The process for dynamically generating a semantically correct UI for a service invocation in an operation of a SOA-based system management application begins at step 400. In step 402, a computer system (e.g., computer system 700 in FIG. 7) receives request parameter hints 210 (see FIG. 3) as a document (a.k.a. request parameter hints document) and stores the received document in a computer data storage device. The document received in step 402 includes one or more semantic annotations and other information describing one or more elements of a service request input message. In one embodiment, the document received in step 402 is an XML document.

In step 404, hints interpreter 312 (see FIG. 3) interprets hints included in the request parameter hints document received in step 402 and produces metadata as a result.

In step 406, UI generation logic 313 (see FIG. 3) interprets the metadata produced in step 404 to dynamically (i.e., at runtime) generate correct UI panels according to the semantics provided in the semantic annotation(s) included in the document received in step 402.

In step 408, the computer system (e.g., computer system 700 in FIG. 7) receives user input for a service request by one or more user entries and/or one or more user selections made via the UI panels generated in step 406. User input received in step 408 operates a SOA-based system management application. The process for dynamically generating a semantically correct UI for a service invocation ends at step 410.

In the case of several service invocations combined into a complex flow (e.g., by means of Business Process Execution Language (BPEL)), the panels for each single service invocation are generated by the process of FIG. 4 and chained to form a flow of UI panels. In a complex flow (e.g., management flow), input for one service may also be input for one or more other services. Once the input is entered by the user, the input does not have to be queried again in UI panels for subsequent service invocations. Therefore, the process of FIG. 4 reduces the amount of user input required in each of the UI panels associated with a single service invocation making up a complex flow.

Figure 5A:
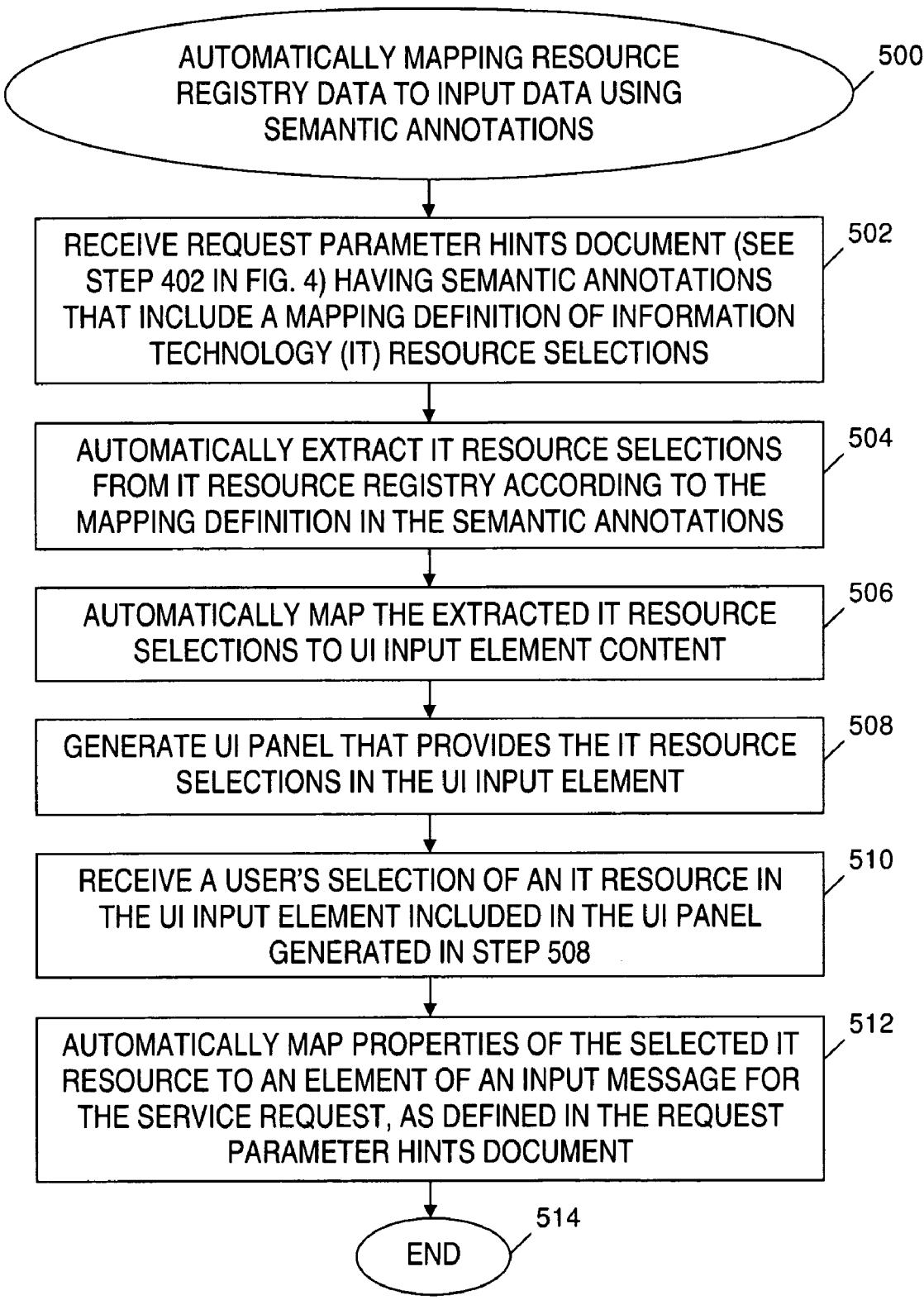
FIG. 5A is a flowchart of a process for automatically mapping resource registry data to input data in the system of FIG. 3, in accordance with embodiments of the present invention.

FIG. 5A is a flowchart of a process for automatically mapping resource registry data to input data in the system of FIG. 3, in accordance with embodiments of the present invention. The process for automatically mapping resource registry data to input data begins at step 500. In step 502, a computer system (e.g., computer system 700 in FIG. 7) receives a request parameter hints document as in step 402 (see FIG. 4). The request parameter hints document received in step 502 has semantic annotations that include a mapping definition of IT resource selections.

In step 504, hints interpreter 312 (see FIG. 3) automatically extracts multiple IT resources (i.e., IT resource selections) from a resource registry (e.g., resource registry 320-1 in FIG. 3). The extraction of IT resource selections in step 504 is based on the mapping definition in the semantic annotations included in the request parameter hints document received in step 502.

In step 506, hints interpreter 312 (see FIG. 3) automatically maps the IT resource selections extracted in step 504 to the content of a UI input element (e.g., input element 322 in FIG. 3). In step 508, UI generation logic 313 (see FIG. 3) generates a UI panel that provides the IT resource selections in the UI input element whose content is mapped to the IT resource selections in step 506.

In step 510, the UI panel generated in step 508 is displayed on a display device by a computer system (e.g., computer system 700 in FIG. 7) and receives a user's selection of one IT resource (e.g., IT resource 318-1 in FIG. 3) of the IT resource selections in the UI input element whose content is mapped to the IT resource selections in step 506.

In step 512, hints interpreter 312 (see FIG. 3) automatically maps one or more values of one or more properties of the selected IT resource to one or more elements of a service request input message, as defined in request parameter hints 210 (see FIG. 3). The mapping of the one or more properties in step 512 is performed in response to receiving the user's selection of the IT resource in step 510. The process for automatically mapping resource registry data to input data ends at step 514.

Figure 5B:
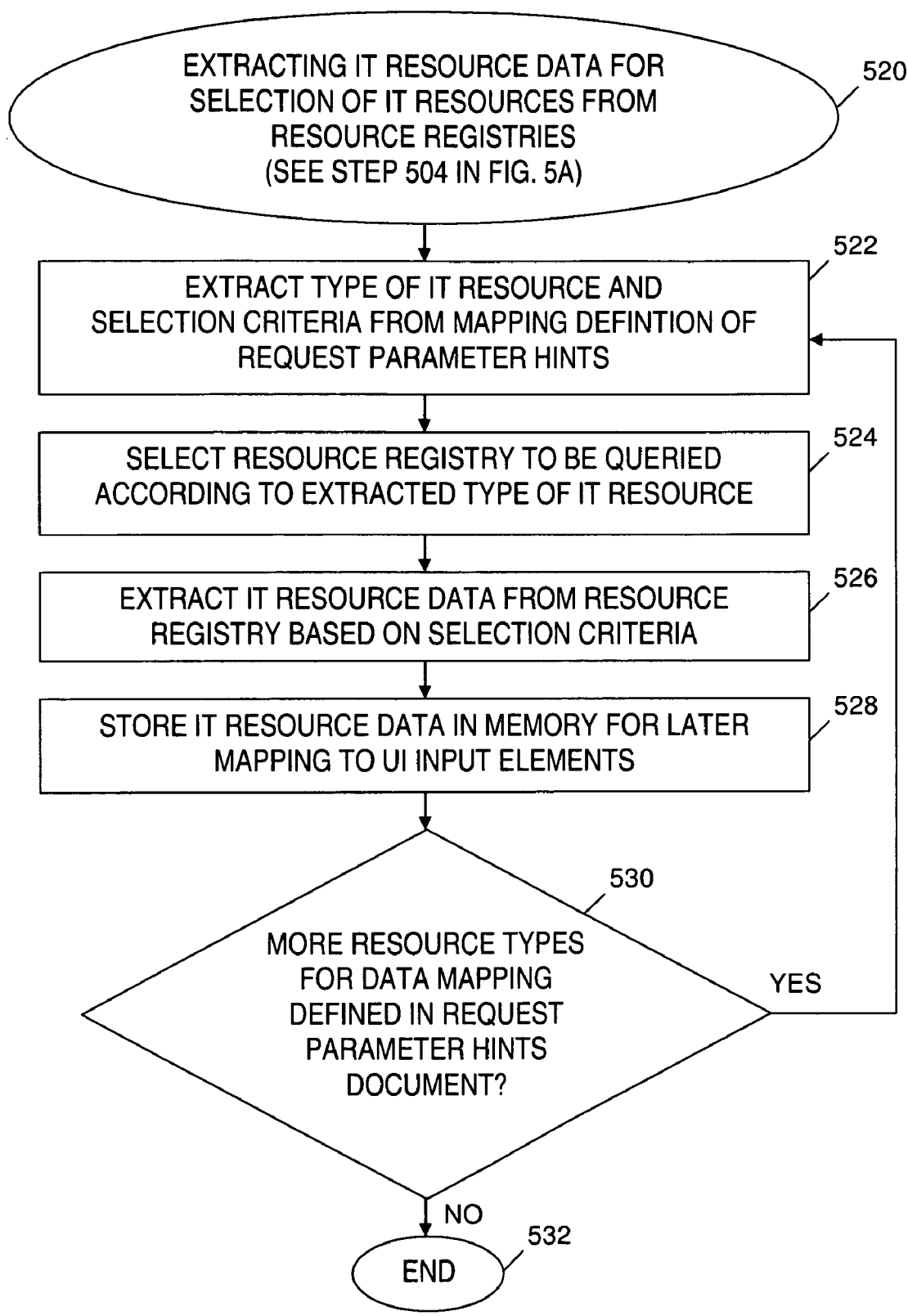
FIG. 5B is a flowchart of a process for extracting IT resource data in the process of FIG. 5A, in accordance with embodiments of the present invention.

FIG. 5B is a flowchart of a process for extracting IT resource data in the process of FIG. 5A, in accordance with embodiments of the present invention. In one embodiment, step 504 in FIG. 5A includes the process of extracting IT resource data in FIG. 5B. The process of FIG. 5B begins at step 520.

Request parameter hints document 210 (see FIG. 3) includes one or more mapping definitions. Each mapping definition maps an input element to a property of an IT resource based on the IT resource being a particular type of resource. For example, a mapping definition included in request parameter hints document 210 (see FIG. 3) may define that input element A is filled with the IP address property of an IT resource based on the IT resource being of type server. Different mapping definitions included in request parameter hints document 210 (see FIG. 3) may map to input elements based on different types of resources.

Furthermore, mapping definitions included in request parameter hints document 210 (see FIG. 3) may optionally include selection criteria defined for the resources being mapped. For example, selection criteria included in a mapping definition may indicate that only servers of a specific hardware type are to be selected.

In step 522, the hints interpreter 312 (see FIG. 3) extracts the following items from the request parameter hints document 210 (see FIG. 3): (1) the type (a.k.a. resource type) of an IT resource for one mapping and (2) selection criteria for the one mapping (if selection criteria exists for the mapping). Hereinafter in the discussion of FIG. 5B, the IT resource whose type is extracted in step 522 is simply referred to as "the IT resource".

Resource registries (e.g., resource registry 320-1 in FIG. 3) are known to system 300 because the resource registries were registered on a resource type basis as a prerequisite for the processes of FIGS. 4, 5A and 5B. For example, there is a resource registry for resources of type server. In step 524, hints interpreter 312 (see FIG. 3) selects the resource registry (e.g., resource registry 320-1 in FIG. 3) to be queried, where the selection of the resource registry is based on the resource type extracted in step 522.

In step 526, hints interpreter 312 (see FIG. 3) extracts IT resource data from the resource registry selected in step 524 by using the selection criteria extracted in step 522. The IT resource data extracted in step 526 includes an identifier of the IT resource and one or more values of one or more properties of the IT resource. For example, data about servers of a specific hardware type may be extracted. If no selection criteria are extracted in step 522, then step 526 includes hints interpreter 312 (see FIG. 3) extracting IT resource data about all IT resources in the resource registry selected in step 524.

In step 528, a computer system (e.g., computer system 700 in FIG. 7) stores the IT resource data extracted in step 526 into a memory operatively coupled to the computer system. The IT resource data stored in the memory is used for (1) display in a UI panel (see step 508 in FIG. 5A) and (2) automatically mapping properties of IT resources to elements of a service request input message (see step 512 in FIG. 5A).

In one embodiment, for each IT resource the memory includes a record that includes an identifier or name for the IT resource and a number of properties (i.e., name-value pairs). One example of the name-value pairs stored in step 528 is presented below:

server1: IP address=10.1.1.1; numberOfProcessors=2; memory=4 GB server2: IP address=10.1.1.2; numberOfProcessors=1; memory=2 GB server3: IP address=10.1.1.3; numberOfProcessors=2; memory=4 GB In the example presented above, the identifier/name is later used for displaying the record in a selection element (e.g., selection element 322 in FIG. 3) in the UI (see step 508 in FIG. 5A). The properties in the example presented above are used for mapping the value of the properties to an element of a service request input message (see step 512 of FIG. 5A).

Request parameter hints document 210 (see FIG. 3) may include more than one mapping definition for a UI panel. In step 530, hints interpreter 312 (see FIG. 3) determines whether or not all resource types in the mapping definitions of the request parameter hints document 210 (see FIG. 3) have been processed already. If step 530 determines that there is another resource type for data mapping defined in the request parameter hints document 210 (see FIG. 3) that has not yet been processed by steps 522-528, then the process of FIG. 5B repeats starting at step 522 with the extraction of the resource type that has not yet been processed. If step 530 determines that all resource types in the mapping definitions of the request parameter hints document have been processed already, then the process of FIG. 5B ends at step 532. After step 532, the process of mapping resource registry data to input data using semantic annotations continues with step 506 in FIG. 5A.

Figure 6:
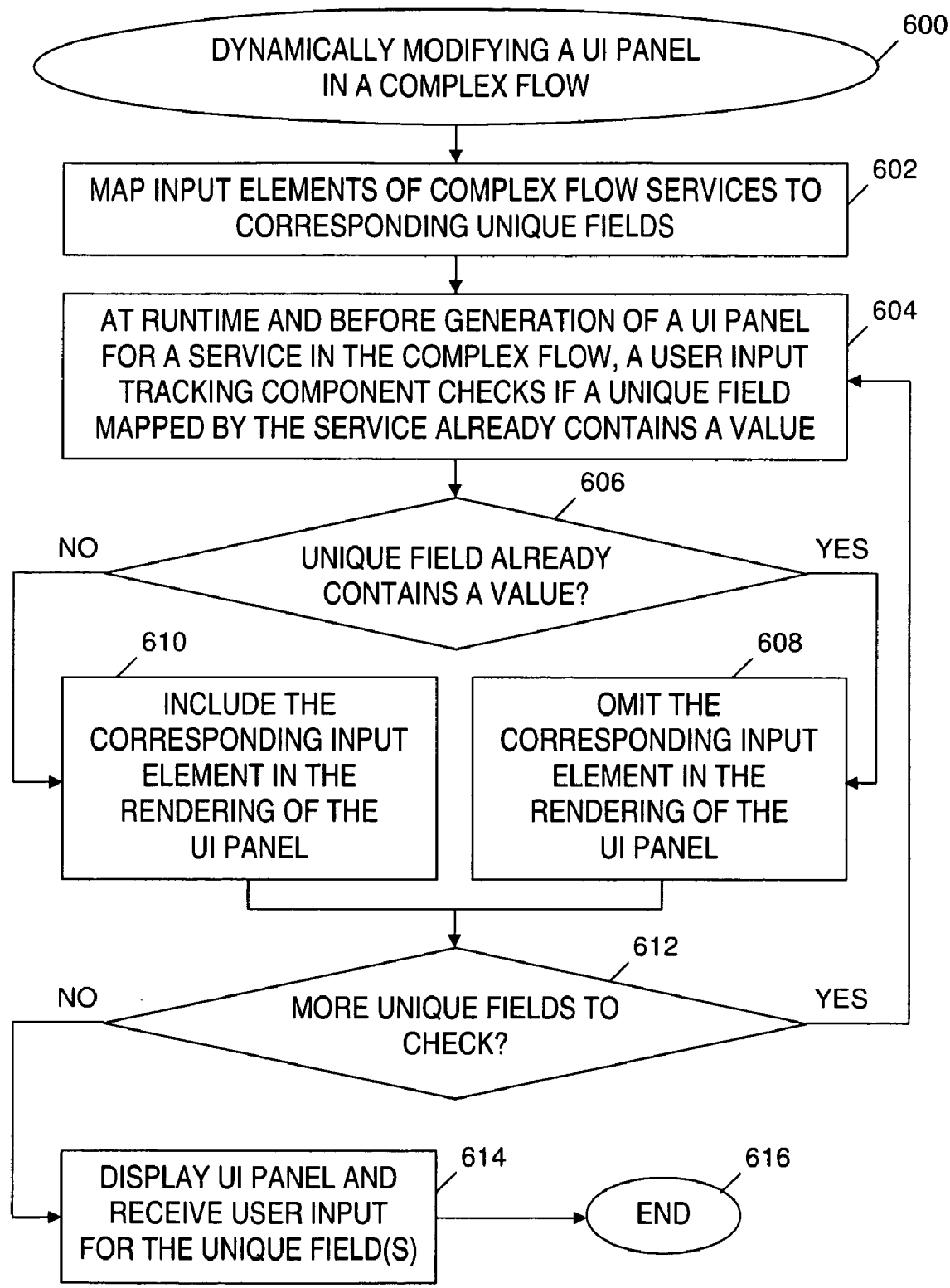
FIG. 6 is a flowchart of a process for dynamically modifying UI panels in a complex flow in the system of FIG. 3, in accordance with embodiments of the present invention.

FIG. 6 is a flowchart of a process for dynamically modifying UI panels in a complex flow in the system of FIG. 3, in accordance with embodiments of the present invention. The process of dynamically modifying UI panels in a complex flow begins at step 600. In step 602, hints interpreter 312 (see FIG. 3) maps input elements of services of a complex flow to unique fields. The input elements are associated with the unique fields in a many-to-one correspondence.

In step 604, which is at runtime and before a generation of a UI panel for one of the services in the complex flow, user input tracker 324 (see FIG. 3) tracks input made by a user and checks whether a unique field already includes a value entered by the user, where the unique field is associated with the service and is mapped in step 602.

If user input tracker 324 (see FIG. 3) determines in step 606 that the unique field being checked in step 604 already includes the value, then the Yes branch of step 606 is taken and step 608 is performed. In step 608, the UI generation logic 313 (see FIG. 3) omits the input element corresponding to the unique field from a rendering of the UI panel.

Returning to step 606, if the user input tracker 324 (see FIG. 3) determines that the unique field being checked in step 604 does not yet include a value, then the No branch of step 606 is taken and step 610 is performed. In step 610, the UI generation logic 313 (see FIG. 3) includes the input element corresponding to the unique field in a rendering of the UI panel.

Inquiry step 612 follows steps 608 and 610. If user input tracker 324 (see FIG. 3) determines in step 612 that there is at least one more unique field to check to determine whether the unique field includes a value previously entered by the user, then the Yes branch of step 612 is taken and the process of FIG. 6 repeats starting at step 604 with a next unique field. Otherwise, if user input tracker 324 (see FIG. 3) determines in step 612 that there are no other unique fields to check in step 604, then the No branch of step 612 is taken and step 614 is performed.

In step 614, a computer system (e.g., computer system 700 in FIG. 7) displays the UI panel on a display device, receives user-defined input for the unique field, and places the user-defined input into the unique field. The displayed UI panel is the panel rendered with the input element(s) included by step 610. Since the unique field includes the value entered by the user, the process of rendering of a subsequent UI panel after step 614 includes: step 604, the Yes branch of step 606, and step 608, which omits a corresponding input element from the rendering of the subsequent UI panel. The process of FIG. 6 ends at step 616.

Using the process of FIG. 6, mapping input or output of one service in a complex flow to input of another service of the complex flow allows for runtime user selection of alternatives for each service. Therefore, the present invention does not need to know the exact flow and/or selection of input alternatives for each service at pre-runtime.

Computer System

Figure 7:
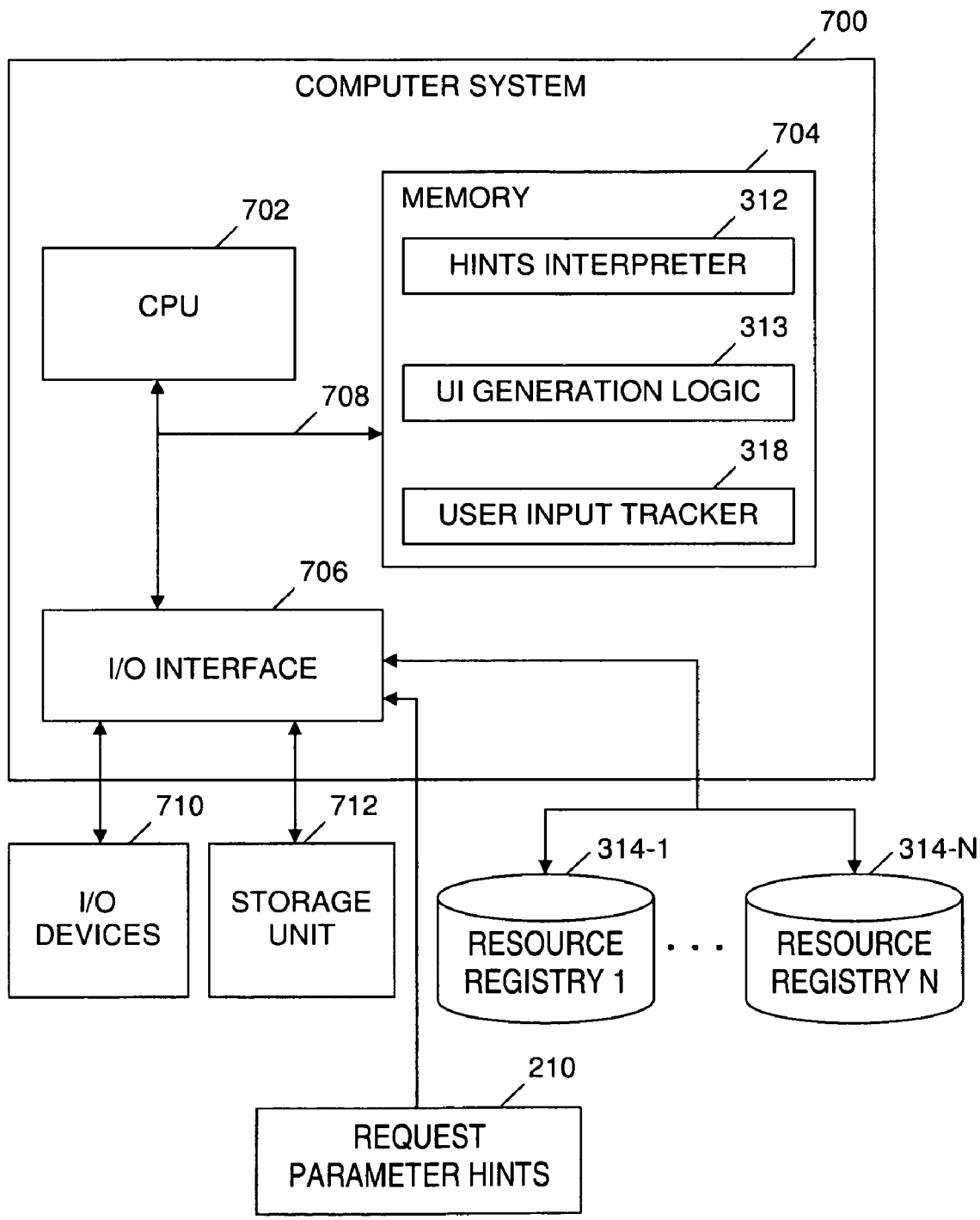
FIG. 7 is a block diagram of a computer system that includes components of the system of FIG. 3, and that implements one or more of the processes of FIG. 4, 5A, 5B, and 6, in accordance with embodiments of the present invention.

FIG. 7 is a block diagram of a computer system that includes components of the system of FIG. 3, and that implements one or more of the processes of FIGS. 4, 5A, 5B, and 6, in accordance with embodiments of the present invention. Computer system 700 generally comprises a central processing unit (CPU) 702, a memory 704, an input/output (I/O) interface 706, and a bus 708. Further, computer system 700 is coupled to I/O devices 710 and a computer data storage unit 712. CPU 702 performs computation and control functions of computer system 700. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code (e.g., code comprising hints interpreter 312, UI generation logic 313 and/or code comprising user input tracker 318) in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 700, and may comprise any type of transmission link, including electrical, optical, wireless, etc.

I/O interface 706 also allows computer system 700 to store and retrieve information (e.g., data or program instructions such as code comprising hints interpreter 312, UI generation logic 313 and/or code comprising user input tracker 318) from an auxiliary storage device such as computer data storage unit 712 or another computer data storage unit (not shown). Computer data storage unit 712 may be a non-volatile storage device, such as a magnetic disk drive (i.e., hard disk drive) or an optical disc drive (e.g., a CD-ROM drive which receives a CD-ROM disk). Hereinafter, code comprising hints interpreter 312 is also referred to as computer program code 312, code 312, and program 312. Hereinafter, code comprising UI generation logic 313 is also referred to as computer program code 313, code 313, and program 313. Hereinafter, code comprising user input tracker 318 is also referred to as computer program code 318, code 318, and program 318.

Memory 704 includes computer program code 312 and computer program code 313 that provide the logic for processes for dynamically generating a semantically correct user interface and for automatically mapping resource registry data to input data using semantic annotations (e.g., the processes of FIGS. 4 and 5A). Memory 704 also may include computer program code 318 that provides the logic for dynamically modifying a UI panel in a complex flow (e.g., the process of FIG. 6). Further, memory 704 may include other systems not shown in FIG. 7, such as an operating system (e.g., Linux) that runs on CPU 702 and provides control of various components within and/or connected to computer system 700.

Memory 704, storage unit 712, and/or one or more other computer data storage units (not shown) that are coupled to computer system 700 may store IT resources 318-1, . . . , 318-N (see FIG. 3), request parameter hints 210 (see FIG. 3), and schema 208 (see FIG. 3).

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 200 in FIG. 2, system 300 in FIG. 3, or computer system 700). Furthermore, an embodiment of the present invention may take the form of a computer program product embodied in any tangible medium of expression (e.g., memory 704 or computer data storage unit 712) having computer-usable program code (e.g., code 312, code 313 or code 318) embodied or stored in the medium.

Any combination of one or more computer-usable or computer-readable medium(s) (e.g., memory 704 and computer data storage unit 712) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 312, the program 313 or the program 318 is printed, as the program 312, program 313 or program 318 can be electronically captured via, for instance, optical scanning of the paper or other medium, then compiled, interpreted, or otherwise processed in a suitable manner, if necessary, and then stored in a computer memory 704. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 312, program 313 and/or program 318) embodied therewith, either in baseband or as part of a carrier wave. The computer-usable program code may be transmitted using any appropriate medium, including but not limited to wireless, wireline, optical fiber cable, RF, etc.

Computer program code (e.g., code 312, code 313 and/or code 318) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computer system 700). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 4, 5A, 5B, and 6) and/or block diagrams of methods, apparatus (systems) (e.g., FIGS. 2, 3 and 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 312, code 313 or code 318). These computer program instructions may be provided to a processor (e.g., CPU 702) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704 or computer data storage unit 712) that can direct a computer (e.g., computer system 700) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 700) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the processes for dynamically generating a semantically correct user interface for a service invocation and for automatically mapping resource registry data to input data using semantic annotations. Thus, an embodiment of the present invention discloses a process for supporting computer infrastructure, comprising integrating, hosting, maintaining and deploying computer-readable code (e.g., code 312, code 313 and/or code 318) into a computer system (e.g., computer system 700), wherein the code in combination with the computer system is capable of performing processes for dynamically generating a semantically correct user interface for a service invocation and for automatically mapping resource registry data to input data using semantic annotations.

In another embodiment, the invention provides a business method that performs the process steps of the invention on a subscription, advertising and/or fee basis. That is, a service provider, such as a Solution Integrator, can offer to create, maintain, support, etc. processes for dynamically generating a semantically correct user interface for a service invocation and for automatically mapping resource registry data to input data using semantic annotations. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 4, 5A, 5B and 6 and the block diagrams in FIGS. 2, 3 and 7 illustrate the architecture, functionality, and operation of possible implementations of systems, methods, and computer program products according to various embodiments of the present invention. In this regard, each block in the flowchart or block diagrams may represent a module, segment, or portion of code (e.g., code 312, code 313 or code 318), which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically mapping resource registry data to input data using semantic annotations, said method comprising:
    a computer system receiving a document having a plurality of semantic annotations that includes a mapping definition including a plurality of types of a plurality of information technology (IT) resources;
    based on said mapping definition, said computer system automatically extracting a plurality of selection elements identifying said plurality of IT resources from a resource registry, wherein said automatically extracting said plurality of selection elements identifying said plurality of IT resources includes:
        extracting a type of an IT resource of said plurality of IT resources from said mapping definition;
        based on said extracted type of said IT resource, selecting said resource registry from a plurality of resource registries;
        extracting, from said selected resource registry, an identifier of said IT resource and a value of a property of said IT resource; and
        based on said extracted identifier of said IT resource, storing said identifier of said IT resource and said value of said property of said IT resource in a memory coupled to said computer system;
    said computer system automatically mapping said extracted plurality of selection elements identifying said plurality of IT resources to a user interface (UI) input element;
    said computer system generating a UI panel that includes said UI input element that includes said extracted plurality of selection elements identifying said plurality of IT resources, wherein said extracted plurality of selection elements identifying said plurality of IT resources includes said identifier of said IT resource;
    said computer system receiving a selection, by a user, of said identifier of said IT resource from among said plurality of selection elements included in said UI input element included in said generated UI panel; and
    responsive to said receiving said selection by said user of said identifier of said IT resource and based on said identifier of said IT resource being extracted from said selected resource registry based on said mapping definition included in said plurality of semantic annotations in said received document, a processor of said computer system automatically mapping said value of said property of said IT resource to said UI input element of an input message of a service request.

2. The method of claim 1, wherein said automatically extracting said plurality of selection elements identifying said plurality of IT resources from a resource registry further includes:
    extracting selection criteria from said mapping definition; and
    determining said IT resource satisfies said selection criteria, wherein said extracting, from said selected resource registry, said identifier of said IT resource and said value of said property of said IT resource is based on said IT resource being determined to satisfy said selection criteria.

3. The method of claim 1, further comprising:
    said computer system retrieving said stored identifier of said IT resource from said memory; and
    responsive to said generating said UI panel and based on said retrieved identifier of said IT resource, said computer system initiating a display of said UI panel on a display device.

4. The method of claim 1, further comprising said computer system retrieving said stored value of said property of said IT resource from said memory, wherein said automatically mapping said value of said property of said IT resource to said UI input element of said input message of said service request is further based on said retrieved value of said property of said IT resource.

5. A computer-implemented method of dynamically modifying a user interface (UI) panel in a complex flow, said method comprising:
    a computer system mapping a plurality of input elements of a plurality of services of a complex flow to a plurality of unique fields, wherein said input elements are associated with said unique fields in a many-to-one correspondence, wherein said complex flow includes a first invocation of a first service that precedes a second invocation of a second service, and wherein said complex flow specifies an output from said first service is an input to said second service;
    said computer system determining a unique field of said plurality of unique fields does not include any value entered by a user;
    responsive to said determining said unique field does not include said any value entered by said user, said computer system rendering a first UI panel for receiving input for said first invocation of said first service in said complex flow and initiating a display of said first UI panel in said complex flow so that said first UI panel includes an input element corresponding to said unique field;
    said computer system receiving a value entered by said user in said input element in said rendered first UI panel;
    at runtime, a processor of said computer system determining said unique field of said plurality of unique fields is required by said second invocation of said second service and includes said value based on said received value having been entered by said user in said input element included in said rendered first UI panel for receiving input for said first invocation of said first service in said complex flow; and responsive to said determining said unique field includes said value, said computer system rendering a second UI panel for receiving input for said second invocation of said second service in said complex flow, wherein said rendering said second UI panel includes omitting said input element in said second UI panel in said complex flow so that said second UI panel lacks said input element that is included in said first UI panel.

6. A computing system comprising a processor coupled to a computer-readable memory unit, said memory unit comprising a software application, said software application comprising instructions that when executed by said processor implement the method of claim 5.

7. A computer program product, comprising a computer-readable storage medium having a computer-readable program code stored therein, said computer-readable program code containing instructions configured to be executed by a processor of a computer system to implement the method of claim 5.

extracting selection criteria from said mapping definition; and determining said IT resource satisfies said selection criteria, wherein said extracting, from said selected resource registry, said identifier of said IT resource and said value of said property of said IT resource is based on said IT resource being determined to satisfy said selection criteria.

8. A computer system comprising:

a central processing unit (CPU);

a memory coupled to said CPU;

a computer-readable, tangible storage device coupled to said CPU, said storage device containing instructions that are carried out by said CPU via said memory to implement a method of automatically mapping resource registry data to input data using semantic annotations, said method comprising:

said computer system receiving a document having a plurality of semantic annotations that includes a mapping definition including a plurality of types of a plurality of information technology (IT) resources;

based on said mapping definition, said computer system automatically extracting a plurality of selection elements identifying said plurality of IT resources from a resource registry, wherein said automatically extracting said plurality of selection elements identifying said plurality of IT resources includes:

extracting a type of an IT resource of said plurality of IT resources from said mapping definition;

based on said extracted type of said IT resource, selecting said resource registry from a plurality of resource registries;

extracting, from said selected resource registry, an identifier of said IT resource and a value of a property of said IT resource; and based on said extracted identifier of said IT resource, storing said identifier of said IT resource and said value of said property of said IT resource in a memory coupled to said computer system;

said computer system automatically mapping said extracted plurality of selection elements identifying said plurality of IT resources to a user interface (UI) input element;

said computer system generating a UI panel that includes said UI input element that includes said extracted plurality of selection elements identifying said plurality of IT resources, wherein said extracted plurality of selection elements identifying said plurality of IT resources includes said identifier of said IT resource;

said computer system receiving a selection, by a user, of said identifier of said IT resource from among said plurality of selection elements included in said UI input element included in said generated UI panel; and responsive to said receiving said selection by said user of said identifier of said IT resource and based on said identifier of said IT resource being extracted from said selected resource registry based on said mapping definition included in said plurality of semantic annotations in said received document, a processor of said computer system automatically mapping said value of said property of said IT resource to said UI input element of an input message of a service request.

9. The computer system of claim 8, wherein said automatically extracting said plurality of selection elements identifying said plurality of IT resources from a resource registry further includes:

extracting selection criteria from said mapping definition; and determining said IT resource satisfies said selection criteria, wherein said extracting, from said selected resource registry, said identifier of said IT resource and said value of said property of said IT resource is based on said IT resource being determined to satisfy said selection criteria.

10. The computer system of claim 8, wherein said method further comprises:

said computer system retrieving said stored identifier of said IT resource from said memory; and responsive to said generating said UI panel and based on said retrieved identifier of said IT resource, said computer system initiating a display of said UI panel on a display device.

11. The computer system of claim 8, wherein said method further comprises said computer system retrieving said stored value of said property of said IT resource from said memory, wherein said automatically mapping said value of said property of said IT resource to said UI input element of said input message of said service request is further based on said retrieved value of said property of said IT resource.

12. A computer program product, comprising a computer-readable, tangible storage device having a computer-readable program code stored therein, said computer-readable program code containing instructions that are carried out by a central processing unit (CPU) of a computer system to implement a method of automatically mapping resource registry data to input data using semantic annotations, said method comprising:

said computer system receiving a document having a plurality of semantic annotations that includes a mapping definition including a plurality of types of a plurality of information technology (IT) resources;

based on said mapping definition, said computer system automatically extracting a plurality of selection elements identifying said plurality of IT resources from a resource registry, wherein said automatically extracting said plurality of selection elements identifying said plurality of IT resources includes:

extracting a type of an IT resource of said plurality of IT resources from said mapping definition;

based on said extracted type of said IT resource, selecting said resource registry from a plurality of resource registries;

extracting, from said selected resource registry, an identifier of said IT resource and a value of a property of said IT resource; and based on said extracted identifier of said IT resource, storing said identifier of said IT resource and said value of said property of said IT resource in a memory coupled to said computer system;

said computer system automatically mapping said extracted plurality of selection elements identifying said plurality of IT resources to a user interface (UI) input element;

said computer system generating a UI panel that includes said UI input element that includes said extracted plurality of selection elements identifying said plurality of IT resources, wherein said extracted plurality of selection elements identifying said plurality of IT resources includes said identifier of said IT resource;

said computer system receiving a selection, by a user, of said identifier of said IT resource from among said plurality of selection elements included in said UI input element included in said generated UI panel; and responsive to said receiving said selection by said user of said identifier of said IT resource and based on said identifier of said IT resource being extracted from said selected resource registry based on said mapping definition included in said plurality of semantic annotations in said received document, a processor of said computer system automatically mapping said value of said property of said IT resource to said UI input element of an input message of a service request.

13. The program product of claim 12, wherein said automatically extracting said plurality of selection elements identifying said plurality of IT resources from a resource registry further includes:

extracting selection criteria from said mapping definition; and determining said IT resource satisfies said selection criteria, wherein said extracting, from said selected resource registry, said identifier of said IT resource and said value of said property of said IT resource is based on said IT resource being determined to satisfy said selection criteria.

14. The program product of claim 12, wherein said method further comprises:

said computer system retrieving said stored identifier of said IT resource from said memory; and responsive to said generating said UI panel and based on said retrieved identifier of said IT resource, said computer system initiating a display of said UI panel on a display device.

15. The program product of claim 12, wherein said method further comprises said computer system retrieving said stored value of said property of said IT resource from said memory, wherein said automatically mapping said value of said property of said IT resource to said UI input element of said input message of said service request is further based on said retrieved value of said property of said IT resource.

* * * * *